United States Patent [19]

Patacca

[11] Patent Number: 4,934,899
[45] Date of Patent: Jun. 19, 1990

[54] METHOD FOR CONTAINING PARTICLES IN A ROTARY MACHINE

[75] Inventor: Angelo M. Patacca, Glastonbury, Conn.

[73] Assignee: United Technologies Corporation, Hartford, Conn.

[21] Appl. No.: 231,630

[22] Filed: Aug. 8, 1988

Related U.S. Application Data

[60] Continuation of Ser. No. 585,069, Mar. 1, 1984, abandoned, which is a division of Ser. No. 332,697, Dec. 21, 1981, Pat. No. 4,484,856.

[51] Int. Cl.$^5$ ............................................. F04D 29/40
[52] U.S. Cl. ........................................ 415/9; 29/121.3; 138/110; 139/387 R; 181/222; 242/117
[58] Field of Search ............... 415/1, 9, 119, 197, 415/196, 128; 416/2; 403/43, 44, 45, 46, 344; 242/117, 77.3, 77.4; 138/148, 113, 114, 99, 110; 181/400, 401, 118, 204, 207, 183, 213, 214, 222, 224; 220/414; 139/387 R; 264/229, 292, 230; 29/121.3, 131, 448, 128

[56] References Cited

U.S. PATENT DOCUMENTS

| | | | |
|---|---|---|---|
| 1,281,940 | 10/1918 | Goedike | 29/131 |
| 1,329,208 | 1/1920 | Powell | 264/292 |
| 2,356,948 | 8/1944 | Reed | 264/230 |
| 2,444,123 | 6/1948 | Walsh | 264/292 |
| 2,489,791 | 11/1949 | Liler et al. | 29/131 |
| 3,097,442 | 7/1963 | Willingham, Jr. | 29/128 |
| 3,223,765 | 12/1965 | McNeil | 264/229 |
| 3,436,041 | 4/1969 | Haller | 264/230 |
| 3,466,210 | 9/1969 | Warchem | 264/230 |
| 3,673,295 | 6/1972 | Winchklhofer et al. | 264/230 |
| 4,057,450 | 11/1977 | Lee | 264/229 |
| 4,263,246 | 4/1981 | Mercer | 264/230 |
| 4,365,393 | 12/1982 | Hauffe et al. | 24/279 |
| 4,452,563 | 6/1984 | Belanger et al. | 415/9 |
| 4,475,864 | 10/1984 | Patacca et al. | 415/9 |
| 4,484,856 | 11/1984 | Patacca | 415/9 |
| 4,490,092 | 12/1984 | Premont | 415/9 |
| 4,705,454 | 11/1987 | Bouiller | 415/9 |
| 4,718,818 | 1/1988 | Premont | 415/9 |

FOREIGN PATENT DOCUMENTS

| | | | |
|---|---|---|---|
| 105981 | 12/1938 | Australia | 29/448 |
| 1245415 | 9/1971 | United Kingdom . | |
| 1480378 | 7/1977 | United Kingdom . | |
| 2037900 | 7/1980 | United Kingdom . | |

Primary Examiner—Edward K. Look
Assistant Examiner—John T. Kwon
Attorney, Agent, or Firm—Gene D. Fleischhauer

[57] ABSTRACT

A circumferentially extending structure 30 for containing particles having an axial component of velocity and a radial component of velocity is disclosed. The structure includes an inner casing, such as the first casing 48, and an outer casing, such as the second casing 50. The outer casing is flexible. The outer casing is formed of a plurality of layers of fabric and by applying a load to the fabric such as a plurality of bars 80, 82 and turnbuckles 74. A method of forming the structure is disclosed. The method includes the step of wrapping a fabric having a first length about the inner casing and the step of stretching the fabric to a second length to affect the operative response of the fabric to the impact of a particle.

14 Claims, 9 Drawing Sheets

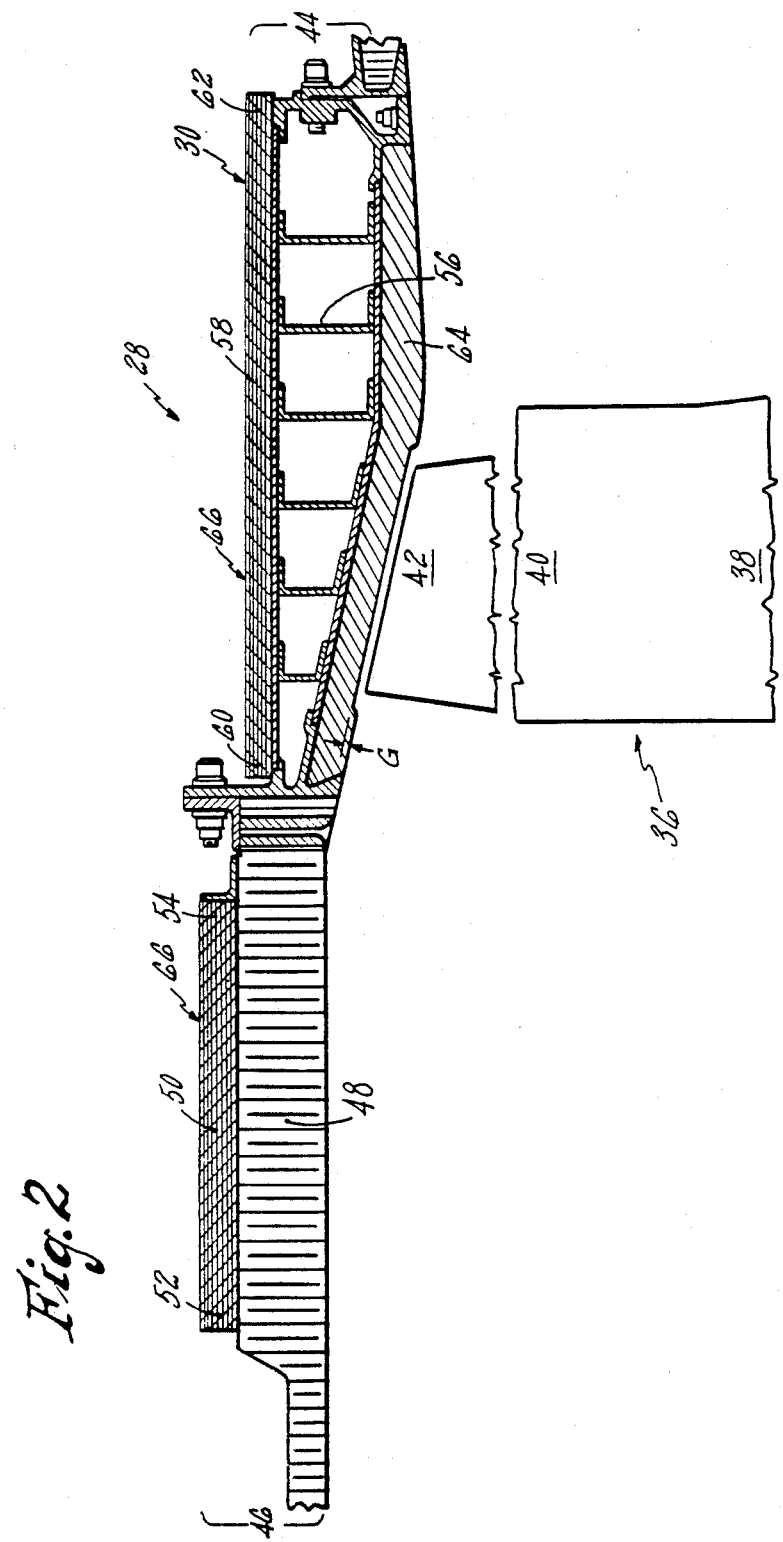

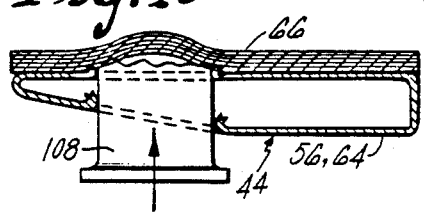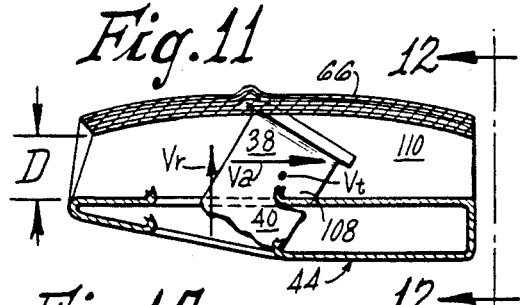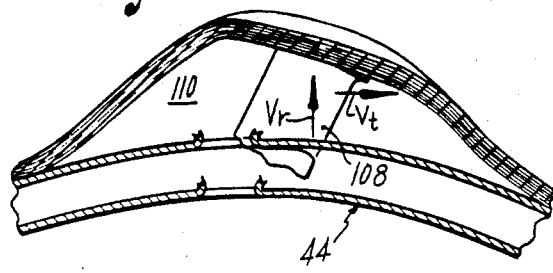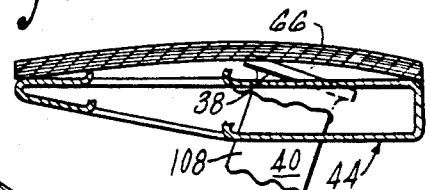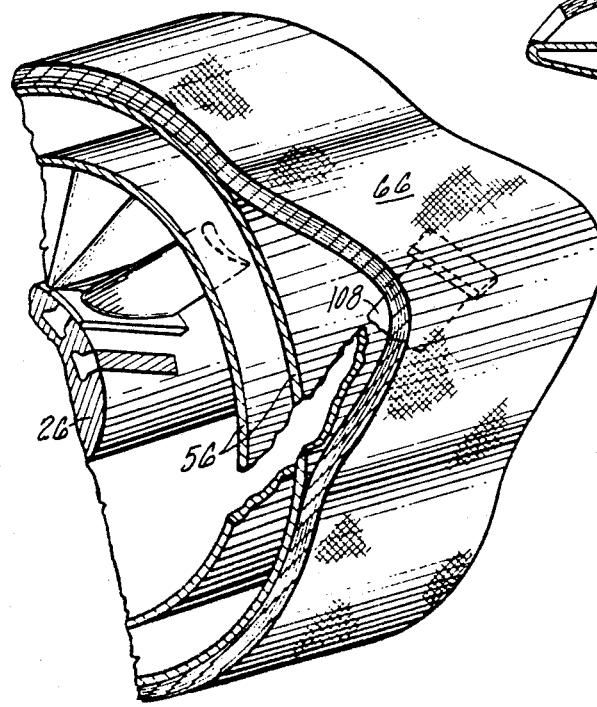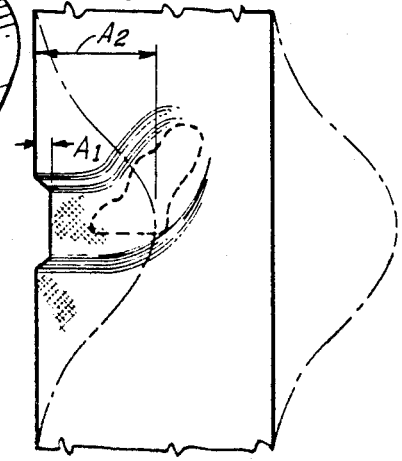

METHOD FOR CONTAINING PARTICLES IN A ROTARY MACHINE

This is a continuation of application Ser. No. 585,069, filed on Mar. 1, 1984, now abandoned, which is a division of application Ser. No. 332,697 filed on Dec. 21, 1981 now U.S. Pat. No. 4,484,856 issued Nov. 27, 1984.

CROSS REFERENCE TO RELATED APPLICATIONS

This application relates to U.S. Application Ser. No. 332,693 filed Dec. 21, 1981 (now U.S. Pat. No. 4,452,565) for CONTAINMENT STRUCTURE by Richard J. Monhardt et al.; U.S. Application Ser. No. 332,694 filed Dec. 21, 1981 (now U.S. Pat. No. 4,500,252) for BEAM FOR A CONTAINMENT STRUCTURE by Alfred B. Orr et al.; U.S. Application Ser. No. 678,842 filed Dec. 3, 1984 for BEAM FOR A CONTAINMENT STRUCTURE by Alfred B. Orr et al.; U.S. Application Ser. No. 332,695 filed Dec. 21, 1981 (now U.S. Pat. No. 4,490,092) for CONTAINMENT STRUCTURE by Emile J. Premont; U.S. Application Ser. No. 647,195 filed Sept. 4, 1984 for CONTAINMENT STRUCTURE by Emile J. Premont; U.S. Application Ser. No. 332,696 filed Dec. 21, 1981 (now U.S. Pat. No. 4,475,864) for CONTAINMENT STRUCTURE by Angelo M. Patacca et al; U.S. Application Ser. No. 332,698 filed Dec. 21, 1981 (now U.S. Pat. No. 4,452,563) for CONTAINMENT STRUCTURE by Angelo M. Patacca et al.

TECHNICAL FIELD

This invention relates to a circumferentially extending structure for containing particles having an axial component of velocity and a radial component of velocity. The invention has particular application to the field of axial flow rotary machines and to the containment of particles resulting from the separation of a rotor blade from a rotating assembly in such a machine but is not limited to the field of axial flow rotary machines.

BACKGROUND ART

In axial flow rotary machines, rotor assemblies are driven at high rotational speeds about an axis of rotation. The rotor assemblies include rotor disks and rotor blades. Foreign objects, such as birds, hailstones or other objects, which on occasion are ingested into the engine may strike the blades causing parts of the rotor assembly to fragment or to separate from the rotor disk. During such a failure pieces of the rotor assembly may be hurled outwardly from the rotor assembly with velocities of several hundred feet per second. Such velocities typically have components in the axial, tangential and radial directions. One device for containing such fragments is shown in British Patent Specification No. 1,245,415 issued to Mottram et al entitled "Improvements in or Relating to Fluid Flow Machines". Mottram shows a containment structure formed of two similar metal strip members wound together to form a helical shield about a casing. U.S. Pat. No. 2,999,667 entitled "Protective Arrangement for Use with Apparatus or Machines Having Rotating Parts" issued to Morley shows a containment structure formed of a web of interwoven wires which are continuous from one end of the web to the other. The web is disposed in coil form in a casing about an array of rotor blades.

Several patents show containment structures formed from synthetic fibers which are woven into a fabric or webbing. U.S. Pat. No. 4,057,359 entitled "Ballistic Nylon Fabric Turbine Governor Housing Shielding Means" issued to Grooman shows a flexible housing cover formed by stitching together two sections of a ballistic nylon fabric. Grooman mentions nylon, an aliphatic polyamide fiber, and Kevlar 49, an aromatic polyamide fiber available from the DuPont Corporation, as Fibers which are suitable for forming the fabric. U.S. Pat. No. 3,602,602 issued to Motta entitled "Burst Containment Means" shows a containment means formed of a winding of tape over a machinery housing and aligned with the expected path of travel of part fragments to contain the part fragments during a failure of the rotary machine. No means are provided for bonding or fastening the adjacent turns of the winding to each other or to the housing about which the tape is wound. The winding of tape is formed of a ballistic nylon material rather than of an aromatic polyamide fiber fabric such as a Kevlar fabric. Use of a Kevlar fabric restrained in the fore and aft direction along the edges outwardly of Kevlar felt trapped radially between the Kevlar fabric and a honeycomb backed steel shell is a contemporaneous recommendation for a containment structure made in a NASA Final Report entitled "Development of Advanced Lightweight Containment System". This report was made under NASA Contract No. NAS3-21823.

In spite of this progress in containment structures, scientists and engineers are seeking to develop containment means which are light in weight and yet which provide containment of particles such that the particles do not escape from the nacelle surrounding the engine even though the particles have substantial axial, tangential and radial velocities.

DISCLOSURE OF INVENTION

According to the present invention, a structure for containing particles has an inner casing and a flexible outer casing which includes a fabric wrapped about the inner casing and placed under tension such that the installed length of the fabric is greater than the free length of the fabric.

In accordance with the present invention, a flexible casing is formed of a fabric having a first end and a second end, and a means for applying a load to the ends of the fabric.

According to one embodiment of the present invention, the leading edge region of the fabric has a greater load than does the remaining portion of the fabric.

In accordance with the present invention, a method of forming a structure for containing particles includes the step of wrapping a fabric about a circumferentially extending structure and the step of applying a load to the fabric, increasing the tension in the fabric to affect the operative movement of the fabric.

A primary feature of the present invention is a rigid inner casing and a flexible outer casing. The flexible casing includes a fabric having two ends and a means for applying a load to the fabric at the ends. The installed length of the fabric is greater than the free length of the fabric. In one embodiment, the means for applying a load to the fabric extends between the ends. In one particular embodiment, the means for applying the load is a plurality of turnbuckles. In one embodiment, the installed length of the fabric is five percent (5%) greater than the free length of the fabric. In one embodiment, the leading edge portion of the fabric has a greater load and a greater tension than does the remaining portion of the fabric.

A primary advantage of the present invention is the containment of particles within the nacelle during a blade failure of the rotary machine which results from absorbing the kinetic energy of the particle with a fabric through a deflection of the fabric. Another advantage is the smaller radial profile of the nacelle which results from decreasing the radial deflection of the fabric during the impact of a particle as compared with structures using untensioned fabric. Still another advantage is the avoidance of the escape of large particles between the edge of the fabric and the support structure by reason of the tension in the fabric. The tension is increased in the edge region of the fabric to contain particles having an axial velocity greater than those particles contained by a uniform tension.

Other features and advantages will be apparent from the specification and claims and from the accompanying drawings which illustrate an embodiment of the invention.

BRIEF DESCRIPTION OF DRAWINGS

FIG. 2 is a cross-sectional view of the fan case structure adjacent the rotor blade and is a side elevation view of the rotor blade with portions of the rotor blade broken away;

FIG. 10 is a schematic representation of a portion of a blade moving outwardly, piercing the rub strip and support structure;

FIG. 11 is a schematic representation of a portion of a blade that has penetrated the support structure and deflected the fabric wrapping;

FIG. 12 is a side elevation view taken along the lines 12—12 of FIG. 11;

FIG. 12a is a perspective view of the rotor assembly, the blade fragment of the rotor assembly, the support structure and the fabric, partly in section and partly broken away;

FIG. 13 is a schematic representation corresponding to FIG. 10 of the portion of the blade after the blade has moved axially with respect to the point of penetration of the support structure;

FIG. 14 is a schematic representation of the blade fragment trapped between the support structure and circumferentially extending fabric; and FIG. 15 is a plan top view along the lines 15—15 of FIG. 13.

BEST MODE FOR CARRYING OUT THE INVENTION

Figure 1:
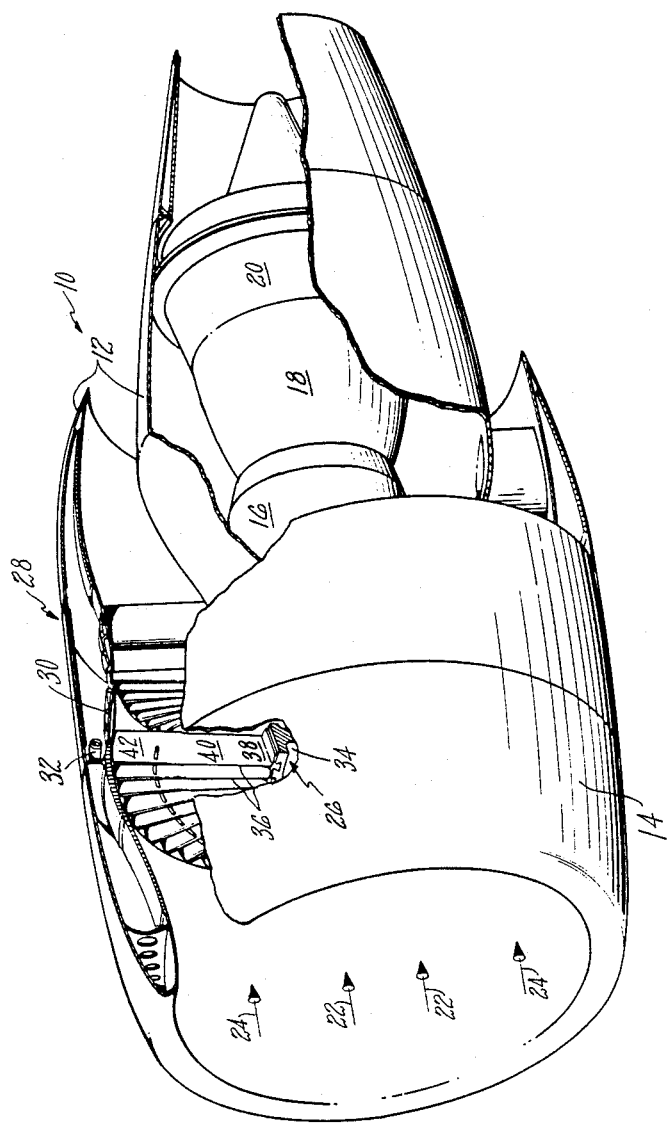
FIG. 1 is a perspective view of an axial flow gas turbine engine mounted in an aircraft nacelle with a portion of the nacelle and the engine broken away to show an array of rotor blades and the adjacent fan case structure in the engine.

A gas turbine engine 10 of the axial flow, turbofan type is shown in FIG. 1. A nacelle 12 circumscribes the engine and is adapted to both support and position the engine from a support structure such as an aircraft wing (not shown). The engine is formed of a fan section 14, a compressor section 16, a combustion section 18 and a turbine section 20. A primary flow path 22 for working medium gases extends rearwardly through these sections. A secondary flow path 24 for working medium gases extends rearwardly, outwardly of the primary flow path.

The fan section 14 includes a rotor assembly 26 and a stator assembly 28. The stator assembly has an axially extending fan case 30 which forms an inner wall of the nacelle 12. Service components such as a duct 32 for anti-icing air and a starter (not shown) for starting the aircraft with compressed air are disposed radially outwardly of the fan case. The rotor assembly includes a rotor disk 34 and a plurality of rotor blades 36. Each rotor blade has a root region 38, a mid-span region 40 and a tip region 42. The rotor blades extend outwardly from the disk across the working medium flow paths into proximity with the stator assembly.

FIG. 2 is an enlarged cross-sectional view of the stator assembly 28 and shows the fan case 30 and one of the rotor blades 36 with portions of the rotor blade broken away. Each rotor blade is spaced radially from the fan case leaving a gap G therebetween. The fan case outwardly of the rotor blade includes a containment case 44 and a forward containment case 46. Both cases are circumferentially extending structures for containing particles having an axial component of velocity and a radial component of velocity. The forward containment case includes a first casing 48 and a second casing 50. The first casing is a structure for supporting the second casing. The second casing is a flexible casing having a leading edge region 52 and a trailing edge region 54. The flexible casing conforms to the exterior of the first casing. The containment case 44 includes a third casing 56 and a fourth casing 58 outwardly of the third casing. The third casing is a structure for supporting the fourth casing. The fourth casing is a flexible casing having a leading edge region 60 and a trailing edge region 62. The flexible casing conforms to the exterior of the third casing. A rub strip 64 extends circumferentially about the interior of the third casing. The support structures, such as the first casing which is formed of a honey-comb construction or the third casing formed of a hollow beam construction, are lightweight casings but may also be heavier structures such as solid metal cases.

The flexible casing 50 and the flexible casing 58 include a fabric 66 which extends circumferentially about the associated inner casings 48, 56. The fabric is under tension such that the installed length of the fabric is greater than the free length of the fabric. The term "fabric" includes, but is not limited to, tape, woven material or the like and may be formed of organic or inorganic material. One satisfactory fabric is formed from a yarn made of aromatic polyamide fibers such as Kevlar 29. (Kevlar is a registered trademark of the DuPont Corporation). The yarn has a fineness of fifteen hundred (1500) deniers. The yarn is woven with a twenty-four (24) strand by twenty-four (24) strand basket weave pattern into a fabric having selvaged edges. A satisfactory fabric having selvaged edges is available as Style 120 Kevlar Fabric from Fabric Development, Incorporated, Quakertown, Pa.

Figure 3:
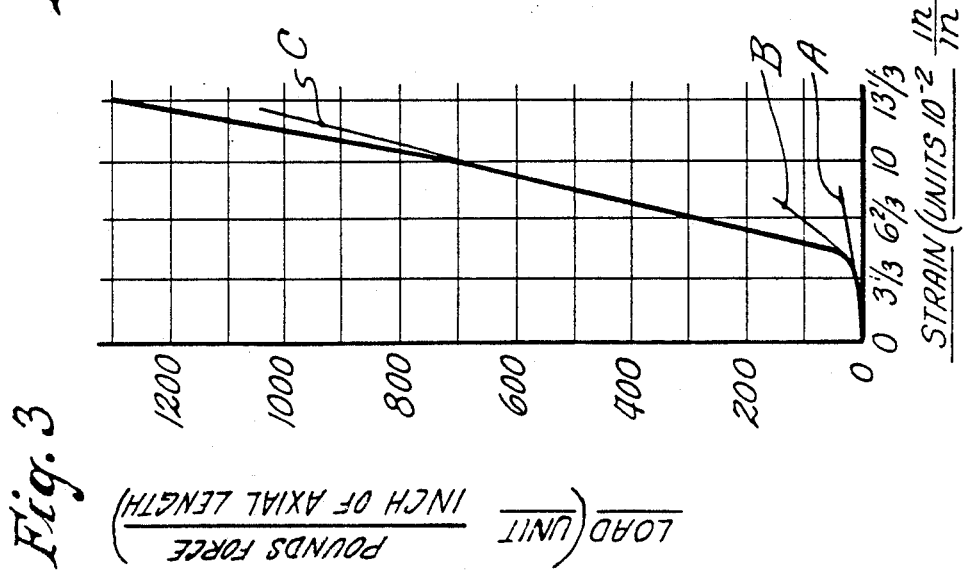
FIG. 3 is a graphical representation of the axial force required to cause an incremental increase in the length of a fabric.

FIG. 3 is a graphical representation of the elongation per length of woven Kevlar 29 fabric resulting from a force acting in the direction of elongation. The vertical axis of the graph is the total force applied to the fabric divided by the width of the fabric in inches. The horizontal axis is the quantity resulting from dividing the total elongation resulting from the application of the force by the free length of the fabric before elongation. The slope of the curve at any point along the curve is a constant of proportionality between the force per unit of width, and the elongation per unit of length of the fabric. The constant of proportionality is often called the force constant, or the stiffness coefficient or the spring constant of the fabric Thus, the spring constant is defined as the ratio of the force per unit of elongation and may be expressed in pounds force per inch ($lb_f$/in.), newtons per meter, or in dynes per centimeter. The line A, the line B and the line C shown in FIG. 3 approximate three spring force constants of the fabric which are nearly linear over a range of deflection.

Figure 4:
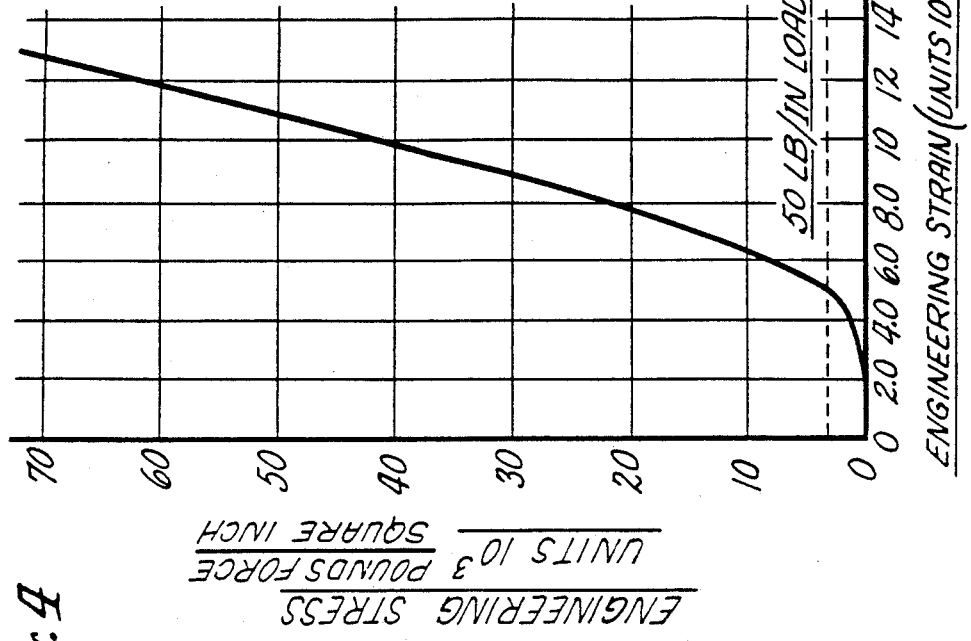
FIG. 4 is a graphical representation of the engineering stress occurring in the fabric versus the engineering strain in the fabric.

FIG. 4 is a graphical representation of engineering stress in the fabric versus the engineering strain of the fabric. The area under the curve is a measure of the amount of work per unit volume of the fabric which may be done on the fabric without causing it to rupture, neglecting frictional forces and adiabatic heating of the fabric.

Figure 5:
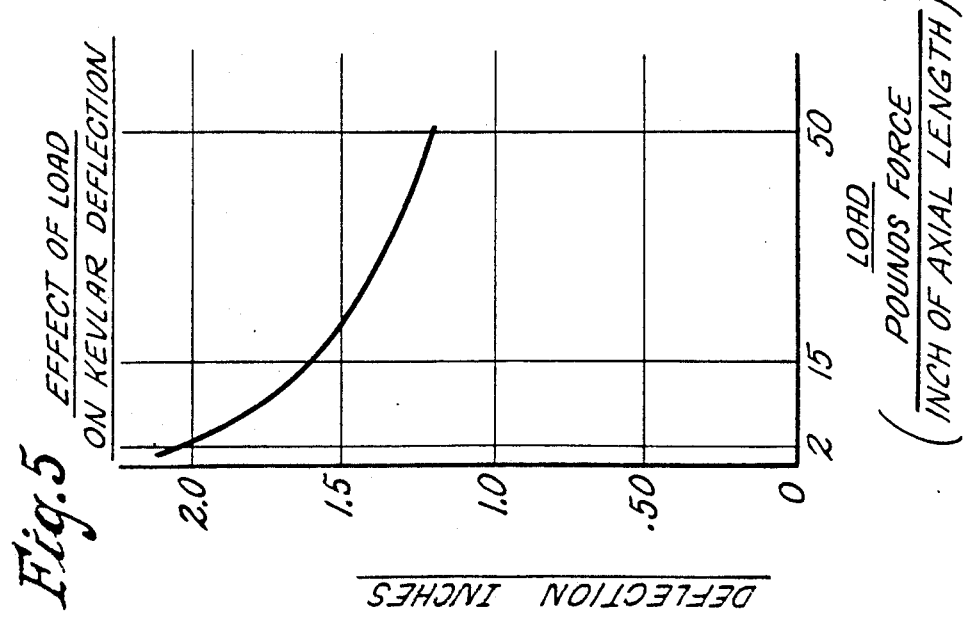
FIG. 5 is a graphical representation of the deflection of the fabric resulting from an impact against the fabric by a projectile having only radial velocity as a function of preload on the fabric in the installed condition.

FIG. 5 is a graphical representation of the deflection of the fabric resulting from an impact against the fabric by a projectile having only radial velocity as a function of preload on the fabric in the installed condition. Fifteen continous wraps of the woven Kevlar 29 fabric extending circumferentially about a twenty-inch diameter support structure were struck by a one-hundred and ten grain projectile. Testing demonstrated that as the preload on the fabric (and thus the tension) was increased, the amount of deflection of the fabric was decreased.

Figure 6:
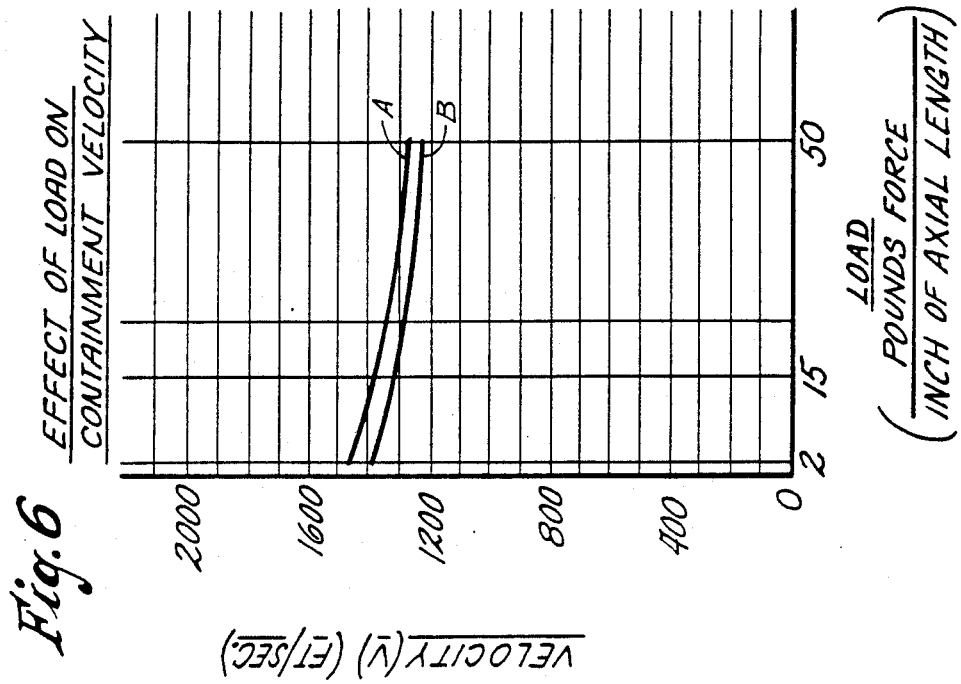
FIG. 6 is a graphical representation of the capability of the preloaded fabric to contain a projectile having only radial velocity as a function of the velocity of the projectile.

FIG. 6 is a graphical representation of the capability of the preloaded wraps of fabric to contain a one-hundred and ten grain projectile. The velocity of projectiles contained and not contained is plotted as a function of the preload (and thus the tension) on the fabric in the installed condition. As with FIG. 5, the projectile was impacted against fifteen wraps of fabric extending circumferentially about a twenty inch diameter support structure. Increased preloads on the fabric decreased the velocity at which the projectile was contained. Curve A is the lowest velocity of projectiles not contained. Curve B is the highest velocity of projectiles contained.

Figure 7:
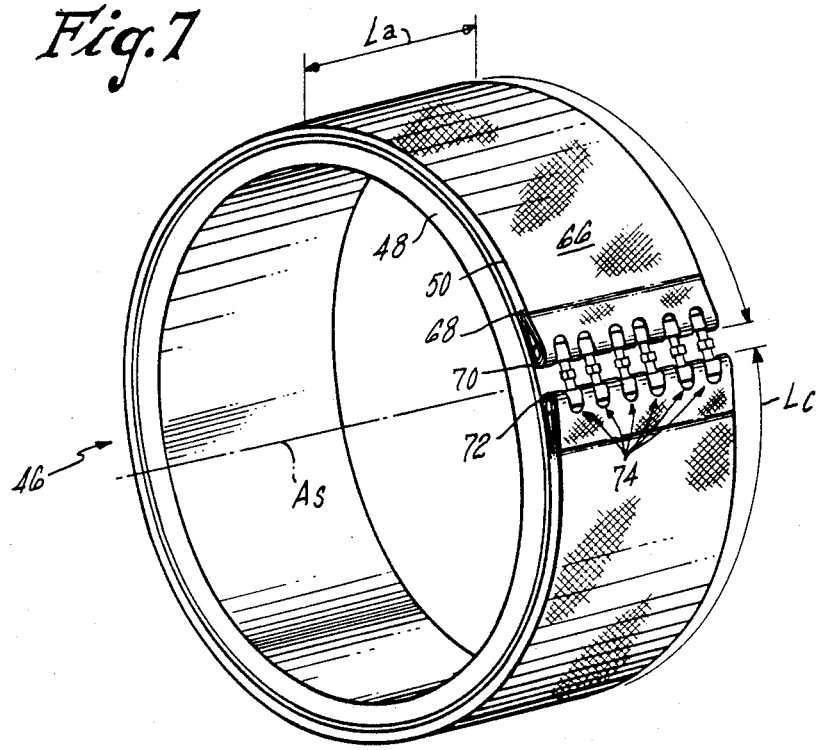
FIG. 7 is a schematic view of the forward portion of the fan case showing an inner casing and a flexible outer casing.

FIG. 7 is a schematic view of the forward containment case 46 showing the inner first casing 48 and the flexible second casing 50. The fabric 66 includes a plurality of layers 68 of material. The number of layers of fabric and the thickness of the layers of fabric are a function of the energy contained in any particles that will impact against the layers. The layers are adapted to extend circumferentially about the axially extending flow paths 22, 24. Each layer is formed of Style 120 Kevlar fabric. Each layer of the fabric has a first end 70 and a second end 72. The second end is spaced circumferentially from the first end. Each layer has an axial length $L_a$ as measured in a plane parallel to the axis of symmetry $A_S$ and a circumferential length $L_c$ as measured in a plane perpendicular to the axis of symmetry $A_S$. The circumferential length extends between the first end and the second end of each layer. A means 74 is provided for applying a load to the first end and the second end of the fabric. The means engages the ends to place the fabric in tension.

Figure 8:
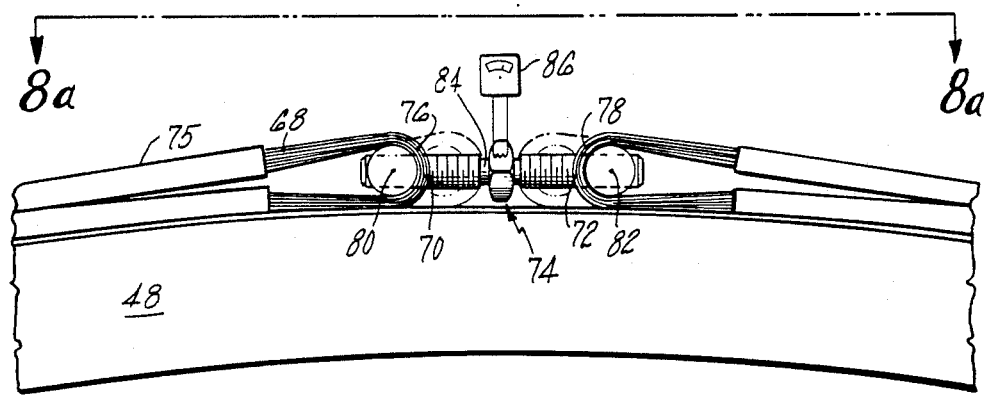
FIG. 8 is an enlarged side elevation view of a portion of the flexible outer casing.

FIG. 8 is an enlarged side elevation view of a portion of the fabric shown in FIG. 7 showing the layers 68 and the means 74 for applying a load to the ends 70, 72. A sheet 75 may extend circumferentially about the layers of fabric to protect the layers from the elements. by a plurality of first loops 76 to engage the means for applying a load. The second end 72 of the fabric is adapted by a plurality of second loops 78 to engage the means for applying a load to the fabric. The means 74 has at least one first bar 80 and at least one second bar 82. Each bar extends in a generally axial direction. Each bar adapts the means 74 to engage an associated plurality of loops. The means 74 is provided with a means 84 for bringing the two bars closer together and for securing the fabric against contraction. In the embodiment shown, the means 84 is a turnbuckle which restrains the ends of the fabric against movement.

One satisfactory turnbuckle is described in NAS (National Aerospace Standard) 2707.30. A satisfactory bar is described in NAS (National Aerospace Standard) 25-7R. The moved position of the fabric and the bars connected to the turnbuckle is shown by the broken line. A means 86 is provided for monitoring the load exerted by the turnbuckle on the fabric through the bars. In the embodiment shown, the means 86 is a strain gauge.

Figure 8A:
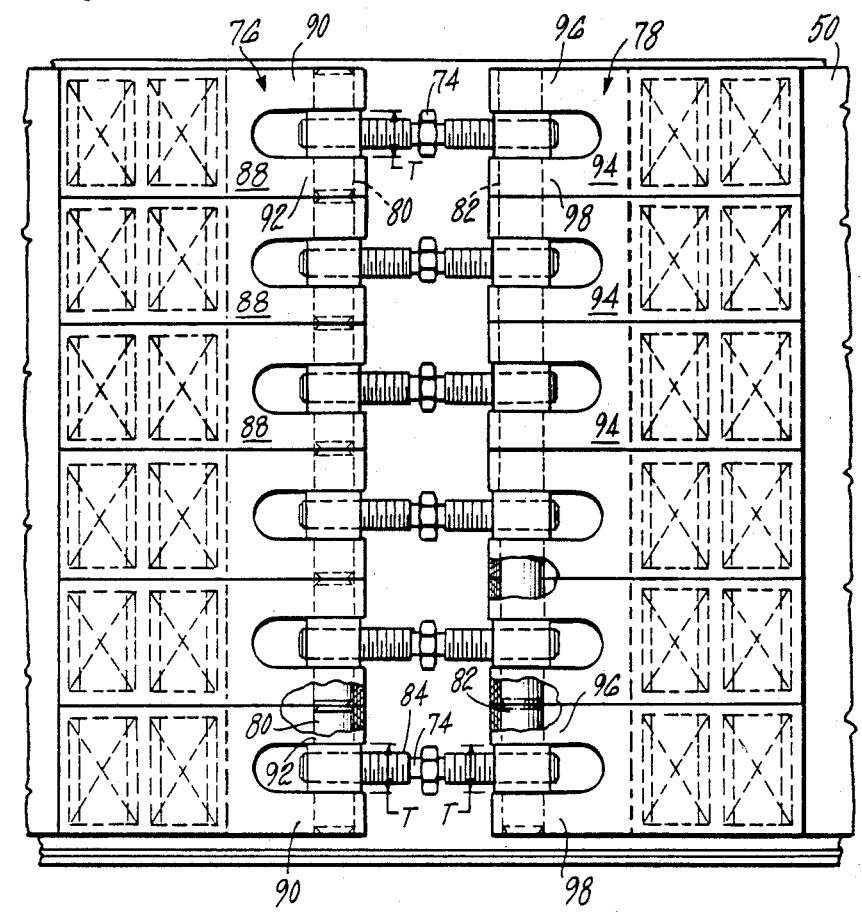
FIG. 8a is a view taken along the lines 8a—8a of FIG. 8.

FIG. 8a is a plan view of the flexible casing 50 taken along the lines 8a—8a of FIG. 8. The plurality of first loops 76 is formed of a plurality of first ribbons 88. Each ribbon has a first strip 90 and a second strip 92 spaced axially from the first strip leaving a gap T therebetween. Similarly, the plurality of second loops 78 is formed cf a plurality of second ribbons 94 each having a first strip 96 and a second strip 98. As shown, the first bar 80 engages the plurality of first loops 76. The second bar 82 engages the plurality of second loops 78. In an alternate embodiment, a plurality of first bars 80 engages the plurality of first ribbons with one bar at each ribbon. Each bar extends in a generally axial direction to engage the strips 90,92 of the associated ribbon. Similarly, a plurality of second bars 82 engages the plurality of second ribbons with one bar at each ribbon. Each bar extends in a generally axial direction to engage the strips 96, 98 of the associated ribbon. A plurality of turnbuckles 74 extends to the pairs of bars through the gaps T enabling each turnbuckle to engage an associated pair of bars.

Figure 8B:
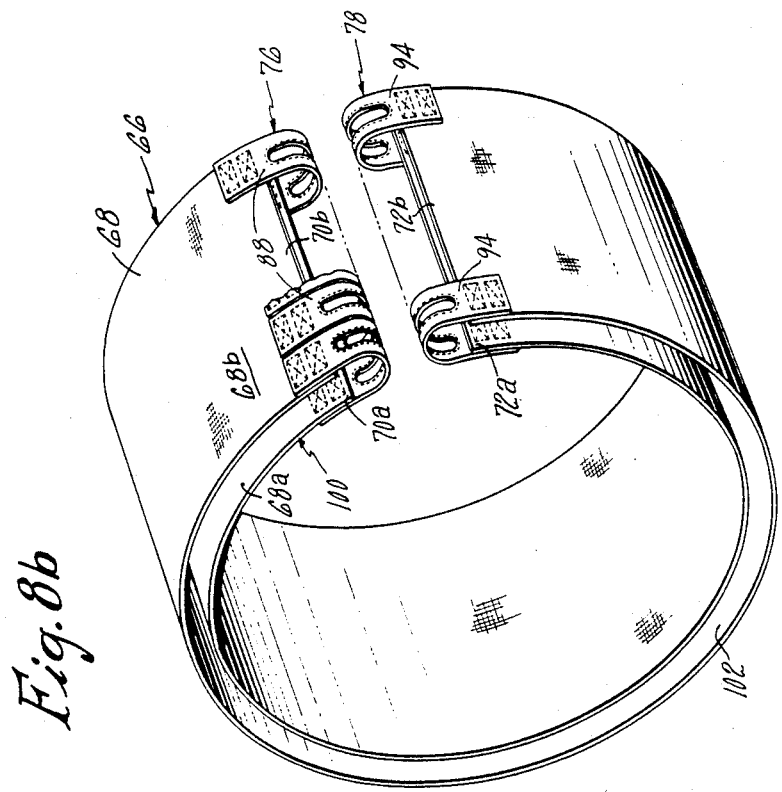
FIG. 8b is a partial perspective view of the fabric used in the flexible fan case with all but the outermost layers broken away.

FIG. 8b is a perspective view of the fabric 66 with all but the outermost pair of layers of material 68 broken away for clarity. Pairs of layers are connected together beginning with the outermost pair of layers to form a plurality of circumferentially continuous bands of material 100. Each band is formed of a first layer 68a of material having a first end 70a and a second end 72a corresponding to the first end 70 and the second end 72 of the fabric. The second layer 68b of material of the pair of layers has a first end 70b and a second end 72b. The first loop 76 extends between the first end of the first layer and the first end of the second layer. The second loop 78 extends between the second end of the first layer and the second end of the second layer. As shown the first loop is formed of a plurality of first ribbons 88 and the second loop is formed of a plurality of second ribbons 94. Each loop is attached to the first layer and the second layer by threads extending through the loop and through the layers. One satisfactory thread is a cotton polyester thread No. 12-24 left twist thread. The spacing of the stitches is eight to ten stitches per inch.

Each band of material has a circumferentially continuous inner surface 102 and a circumferentially continuous outer surface 104. During assembly, each band of material is disposed entirely within the adjacent outermost band. The inner surface of each band abuts the outer surface of the adjacent inward band.

The flexible fourth casing 58 radially outwardly of the third casing 56 physically differs only in size from the flexible second casing 50. The description of the second casing is also a description of the fourth casing. The loading applied by the turnbuckles to the fabric 66 of the fourth casing is different from the loading applied by the turnbuckles to the fabric 66 of the second casing. As each turnbuckle is turned about its axis of rotation, the turnbuckle is shortened, moving the associated bars closer together to the moved position shown in FIG. 8. The load exerted by the bars on the fabric decreases the distance between the bars and causes the portion of the fabric engaged by bars to stretch, increasing the tension in the fabric. In the moved position, the fabric between the moved bars has a second length which is greater than the installed wrapped, length of the fabric about the inner casing. The installed length is equal to or greater than the free length of the fabric.

The load on the fabric and the resulting tension in the fabric are easily determined from the strain in the turnbuckle. By causing an elongation of a known amount in the length of the fabric, the tension in the fabric causes the fabric to resist subsequent deflections during the impact of a particle with a spring constant which is greater than the spring constant approximated by line A in FIG. 3. For example, this greater spring constant may approximate the third spring constant of the fabric as shown by line C of FIG. 3. The third spring constant results from applying a load (and thus a tension) with the turnbuckles to the fabric that is equal to the tension resulting from: a uniform load in the range of 45 to 55 pounds of force per inch of axial length of each layer of fabric. The uniform load is distributed evenly over the axial length of the fabric and acts tangentially to the fabric on a minimum cross-sectional area presented by the fabric to the load. For example, a tension causing the third spring constant in a single layer of a Style 120 Kevlar 29 fabric having an axial width of 12 inches is the tension that results from applying a uniform load of six hundred (600) pounds of force plus or minus sixty ($\pm 60$) pounds to the axial length of the layer. Alternatively, the greater spring constant chosen may approximate the second spring constant of the fabric as shown by line B of FIG. 3. The second spring constant corresponds to a fabric under a circumferential load that is greater than or equal to ten pounds of force per inch of axial length of the fabric. One such load was approximately equal to eighteen pounds of force per inch of axial length of the fabric.

A distinct and particular advantage of the plurality of turnbuckles for applying a load to the ends of the fabric is the tailoring of the load profile. For example, the load might be entirely uniform across the length of the fabric from the leading edge to the trailing edge. In an alternate embodiment, the first load in the leading edge region 60 might equal a second load in the trailing edge region 62. The intermediate loads applied by turnbuckles between the leading edge turnbuckle and the trailing edge turnbuckle might be smaller than the edge loads. Still another embodiment might employ an integral bar extending between the leading edge region and the trailing edge region instead of the plurality of bars. The plurality of turnbuckles would be attached to the integral bar. The load at the leading edge region might then decrease in integral amounts to the lowest load in the trailing edge region.

The flexible casing 50 shown in FIG. 2 extending circumferentially about the inner casing 48 to form the forward containment case 46 has a non-uniform load applied along the axial length of the fabric. The load exerted by the first turnbuckle in the leading edge region 52 is at least forty-six pounds of force per inch (46 lbs$_f$/in) of axial length of each layer of fabric 68 tensioned by the bars 80, 82. The load acts in a direction which causes an elongation of the circumferential length $L_c$ of the fabric. The load exerted by the remaining turnbuckles is approximately eighteen pounds of force per inch of axial length (18 lbs$_f$/in.) of each layer of fabric in the remaining portion of the fabric.

The flexible casing 58 shown in FIG. 2 extending circumferentially about the inner casing 56 to form the containment case 44 has a uniform load applied along the axial length of the fabric. The load acts in a direction which causes an elongation of approximately five percent (5%) of the circumferential length of the fabric. The load is approximately fifty pounds of force per inch of axial length (50 lb$_f$/in) of each layer of fabric.

During operation of the gas turbine engine, the rotor assembly 26 shown in FIG. 2 rotates about the axis rotation $A_r$ at speeds as high as four thousand revolutions per minute (4,000 r.p.m.). As the rotor assembly rotates, the disk 34 exerts a centripetal force on the root region 38 of the rotor blade 36 causing the blade to follow a circular path about the axis of rotation. An impact on the blade by a foreign object may cause the blade to fail in the root region. The following description is illustrative of a typical interaction between the blade, the support structure and the fabric during such a blade failure. This description is not an exhaustive description of all possible interactions between the components during the blade failure. Upon failure, the failed blade breaks in the root region and moves radially outwardly across the gap G (between the tip region 42 and the rub strip). The blade strikes the rub strip and fragmentizes. Typically, the tip region of the blade breaks off from the rotor blade leaving behind the root 38 and midspan portion 40 of the blade. Although the fragment is confined to the flow path by the rub strip, the fragment has a large component of radial velocity by reason of the rotational energy of the blade. The tip fragment has a relatively high axial velocity because of the shape of the flow path and because of the difference in pressure which exists between the leading edge and the trailing edge of the blade. As the tip region fragment moves forwardly and circumferentially, the fragment strikes the inner casing 48 of the forward case 46, slashing through the innner casing which is dimensioned to enable this penetration. The fragment strikes the flexible casing. Because of the radial velocity of the fragment, a portion of the kinetic energy of the fragment is transferred to the flexible casing 50 causing the flexible casing to deflect outwardly away from the inner casing.

Figure 9:
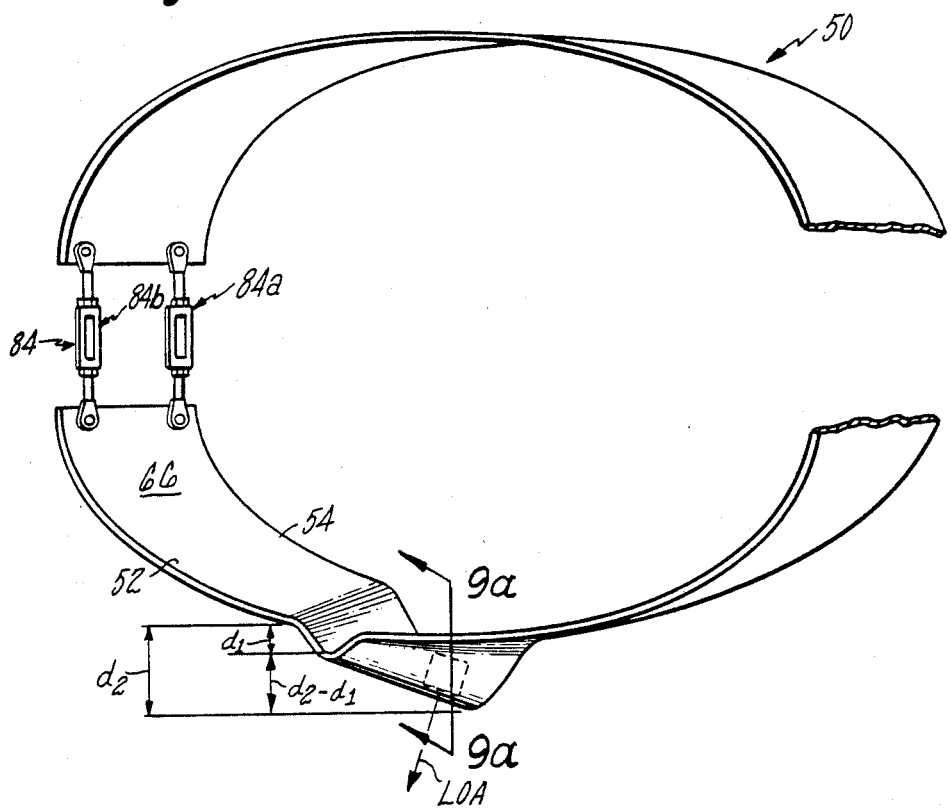
FIG. 9 is a schematic representation of the response of the fabric to an impact by a fragment of the blade.

FIG. 9 is a schematic illustration of the deflection of the tensioned Kevlar fabric 66 which, with the turnbuckles 84, forms the flexible casing 50. The inner casing 48 and the intermediate turnbuckles are broken away for clarity. The trailing edge region 54 of the fabric is at a lower tension than the leading edge region 52 of the fabric by reason of the low tension turnbuckle 84a and the high tension turnbuckle 84a. The impact of the fragment causes the high tensioned leading edge portion of the fabric to elongate and deflect outwardly a lesser amount ($d_1$) in response to the force of the fragment than does the low tensioned fabric ($d_2$) in the trailing edge region. A cone-like shape results in the fabric. The line of action of the particle LOA has components in the axial, the radial and the tangential (circumferential directions. The fragment is guided circumferentially about the inner surface of the fabric by reason of its circumferential velocity in the cone formed as a result of its radial energy.

Figure 9A:
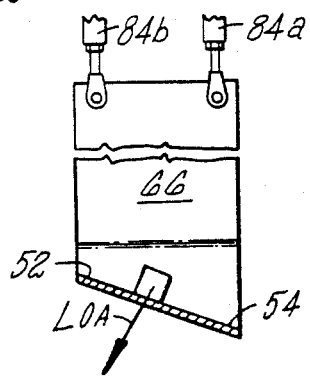
FIG. 9a is a view taken along the lines 9a—9a of FIG. 9.

FIG. 9a is a section taken along the lines 9a—9a of FIG. 9 showing the line of action LOA of the fragment. As the fragment moves in the axially forward direction, the fragment exerts a force against the cone; the fabric blocks the fragment from movement in the axial direction. A loss in axial momentum results and the fragment loses its axial velocity resulting in containment of the particle within the nacelle.

As the tip region fragment moves forwardly, into the forward containment structure, the midspan and base region of the blade are left behind to form a second portion 108 of the blade. The second portion of the blade moves radially outwardly across the radial distance formerly occupied by the tip region and across the gap G to strike the rub strip. The second portion of the blade is of larger size and has more energy than the tip region of the blade.

As shown in the FIG. 10 schematic representation, the energy and strength of the second portion 108 of the blade enables the second portion of the blade to penetrate the rub strip 64 and the inner casing 56 without shattering the blade portion and to strike the Kevlar fabric 66. The Kevlar fabric restrains the outward movement of the second portion of the blade and decreases the outward velocity of the blade.

As the second portion 108 of the blade moves outwardly, the second portion of the blade is struck from behind by the adjacent (following) blade. The following blade turns the root region 38 of the blade outwardly and the midspan region 40 inwardly and drives the second portion of the blade around the circumference of the inner casing, slashing a hole in the inner casing. The second portion of the blade has an axial rearward component of velocity $V_a$ as a result of being struck by the following blade and because of this contact and the rotational energy of the blade, the second portion of the blade has also a radial outward component of velocity $V_r$ and a tangential component velocity $V_t$ in a circumferential direction. As shown in the FIG. 11 schematic representation, the second portion of the blade 108 has penetrated through the inner casing and has impacted against the fabric 66 causing the fabric to deflect outwardly a distance D away from the case.

FIG. 12 is a side elevation view taken along the lines 12—12 of the schematic representation shown in FIG. 11. FIG. 12a is a perspective view of the rotor assembly 26, the blade portion 108, the inner casing 56 and the fabric 66. As the second portion of the blade strikes the fabric and causes the fabric to deflect, a passageway 110 opens for the blade in the axial direction. As shown in FIG. 3, the preload causes the layers of Kevlar fabric to exert a greater radial force during an incremental deflection than the force exerted by untensioned Kevlar fabric during the same deflection. The preload also increases the amount of work absorbed per unit of elongation of the fabric as shown by the area under the stress-strain curve in FIG. 4. Thus, the deflection of the fabric away from the support structure for each unit of energy absorbed is decreased as compared with loosely wrapped fabric.

Experiments on ballistic models indicate that a Kevlar fabric wrap under no tension when hit by a particle will deflect a distance D of seven and one half (7.5 in.) away from a support structure 56 having a diameter of eighty (80) inches. These experiments indicate that loading the Kevlar fabric with a load of fifty pounds force plus or minus five pounds ($50 \pm 5$ lb$_f$) per inch of axial width, will decrease the deflection D of the Kevlar from seven and one-half inches (7.5 in) to three and one-half inches (3.5 in.)

After the maximum deflection of the fabric, the tensioned fabric moves inwardly. The passageway 110 closes before the axial component of velocity of the second portion of the blade causes the blade to move through the passageway out from under the Kevlar fabric.

As shown in FIG. 13 and FIG. 14, the Kevlar fabric begins to snap back towards the case around the blade fragment trapping the fragment between the support inner casing and the Kevlar fabric.

As shown in FIG. 15 reduced plan view, the load (and the associated tension) in the Kevlar fabric also limits the deflection of the Kevalr fabric in the axial direction causing the Kevlar fabric to move axially rearwardly a small distance $A_1$ as compared with the distance $A_2$ that untensioned Kevlar fabric (shown in dotted line) might move. The small axial deflection of the Kevlar fabric keeps the fabric over the hole through the support structure and avoids exposing the nacelle to additional fan blade fragments from other damaged fan blades which might otherwise exit through the inner casing and past the moved Kevlar.

Although the invention has been shown and described with respect to preferred embodiments thereof, it should be understood by those skilled in the art that various changes and omissions in the form and detail thereof may be made therein without departing from the spirit and scope of the invention.

I claim:

1. A method for containing particles in a rotary machine having a flow path for working medium gases comprising:
   disposing a rigid first casing in the rotary machine which extends circumferentially about the working medium flow path;
   forming a flexible second casing about the first casing by
   wrapping a fabric having a first length about the first casing;
   applying a load to the fabric after wrapping the fabric about the first casing to cause an elongation of the fabric such that the fabric has a second length greater than the first length and a level of tension at the second length which is greater than the tension at the first length,
   wherein the level of tension in said fabric urges the fabric inwardly against the first casing to trap between the first casing and the second casing particles having an axial component of velocity and a radial component of velocity with respect to the flow path which penetrate through the rigid first casing at a first location, deflect radially the fabric of the second casing and move axially between the first casing and the second casing with respect to the first location.

2. The method for containing particles in a rotary machine of claim 1 wherein the step of applying a load to the fabric includes the step of increasing the load until an elongation occurs which is equal to at least five percent (5%) of the free length of the fabric.

3. The method for containing particles in a rotary machine of claim 1 wherein the fabric has a first end, a second end, a first spring constant under a first tension and a second spring constant under a second tension which is greater than the first spring constant wherein the step of applying a load to the fabric includes the step of increasing the length of the fabric to cause a level of tension in the fabric which is equal to or greater than said second tension.

4. The method for containing particles in a rotary machine of claim 3 which further includes the step of securing the fabric against contraction by restraining a portion of the fabric against movement.

5. The method for containing particles in a rotary machine of claim 4 wherein the fabric has two ends and the step of securing the fabric against contraction includes the step of securing an end of the fabric to the support structure.

6. The method for containing particles in a rotary machine of claim 4 wherein the fabric has two ends and the step of securing the fabric against contraction further includes the step of restraining an end of the fabric against movement with respect to a second end of the fabric.

7. The method for containing particles in a rotary machine of claim 2 or 4 wherein the step of applying a load to the fabric wrapped about the support structure includes the step of applying a load to the fabric which produces a tension in the fabric equal to the tension produced by a load which is distributed uniformly over the axial length of the fabric, which acts tangentially to the fabric on the minimum cross-sectional are presented by the fabric to the load and which is equal to or greater than ten pounds of force per axial inch of length of the layers of fabric, the axial length being equal to the summation of the axial lengths of all layers of fabric.

8. The method for containing particles in a rotary machine of claim 7 wherein the load lies in a range of forty-five (45) pounds of force to fifty-five pounds of force per axial inch of length of fabric.

9. A method for containing particles in a rotary machine having a flow path for medium working gases comprising:
   disposing a rigid first casing in the rotary machine which extends circumferentially about the working medium flowpath;
   forming a flexible second casing about the structure by
   wrapping a fabric about the first casing, the fabric having an axial length and a first circumferential length about the first casing;
   applying a load to a portion of the axial length of the fabric after wrapping the fabric about the casing to cause an elongation in the fabric such that the circumferential length in said portion of the fabric is greater than the first circumferential length of another portion of the fabric;
   wherein the level of tension in said fabric urges the fabric inwardly against the first casing to trap between the first casing and the second casing particles having an axial component of velocity and a radial component of velocity with respect to the flow path which penetrate through the rigid first casing at a first location, deflect radially the fabric of the second casing and move axially between the first casing and the second casing with respect to the first location.

10. The method for containing particles in a rotary machine for a rotary machine of claim 9 wherein said load is a first load and said portion of the axial length is a first portion and wherein the method further includes the step of applying a second load along a second portion of the axial length of the fabric to cause an elongation in the circumferential length of a second portion of the fabric.

11. The method for containing particles in a rotary machine for a rotary machine of claim 10 wherein the second load is not equal to the first load.

12. The method for containing particles in a rotary machine for a rotary machine of claim 11 wherein the fabric has an edge region extending circumferentially about the first casing and wherein the first portion of the axial length of the fabric is in the edge region of the fabric.

13. A method for containing particles in a rotary machine having a flowpath for working medium gases comprising:
   disposing a rigid first casing in the rotary machine which extends circumferentially about the working medium flowpath;
   forming a flexible second casing about the first casing by
   wrapping a fabric about the first casing, the fabric having a circumferential length, an axial length and a leading edge region extending circumferentially about the casing;
   applying a first load to a first portion of the axial length of the fabric which is in the leading edge region to cause an elongation in the circumferential length of the first portion of the fabric;
   applying a second load to a second portion of the axial length of the fabric to cause an elongation in the circumferential length of the second portion of the fabric, the second load being smaller than the first load.

14. The method for containing particles in a rotary machine of claim 13, the fabric having a trailing edge region wherein the step of applying a second load includes applying the load such that said second portion of the axial length of the fabric is in the trailing edge region of the fabric.

* * * * *